United States Patent [19]
Martin

[11] Patent Number: 5,722,523
[45] Date of Patent: Mar. 3, 1998

[54] FLUID CLUTCH

[75] Inventor: Hans Martin, Stuttgart, Germany

[73] Assignee: Behr GmbH & Co., Stuttgart, Germany

[21] Appl. No.: 697,876

[22] Filed: Aug. 30, 1996

[30] Foreign Application Priority Data

Sep. 12, 1995 [DE] Germany .............. 195 33 641.0

[51] Int. Cl.⁶ .................................... F16D 35/02
[52] U.S. Cl. .................... 192/58.61; 192/58.5
[58] Field of Search .................. 192/58.5, 58.6, 192/58.61, 58.63, 58.68, 58.681, 58.682, 58.7, 58.8, 58.3, 82 T

[56] References Cited

U.S. PATENT DOCUMENTS

| | | |
|---|---|---|
| 3,259,220 | 7/1966 | Roper ........................ 192/58.6 |
| 3,339,689 | 9/1967 | Sataruk ................. 192/58.681 X |
| 4,302,156 | 11/1981 | LaFlame ............... 196/58.61 X |
| 4,405,039 | 9/1983 | Hauser ................... 192/58.5 X |
| 4,437,554 | 3/1984 | Haeck ................... 192/58.8 X |
| 4,653,624 | 3/1987 | Mader . | |
| 5,018,612 | 5/1991 | Takikawa et al. . | |

FOREIGN PATENT DOCUMENTS

| | | |
|---|---|---|
| 37 29 300 | 3/1989 | Germany . |
| 39 38 616 | 5/1990 | Germany . |
| 43 44 085 | 6/1995 | Germany . |

Primary Examiner—Richard M. Lorence
Attorney, Agent, or Firm—Foley & Lardner

[57] ABSTRACT

A fluid clutch has a driven shaft, a drive disk attached to the driven shaft, and a housing rotatably mounted on the driven shaft. The housing has a dividing wall forming a working chamber and a reservoir chamber. At least one inflow orifice is provided in the dividing wall for communicating fluid in the reservoir chamber to the working chamber and a return flow passage in the housing for communicating fluid in the working chamber to the reservoir chamber. The drive disk is rotatable in the working chamber. The inflow orifice is controlled by an electromagnet stationarily positioned in the reservoir to open and close the inflow orifice using a valve lever. A fluid drive, such as impeller vanes are mounted around the electromagnet positioned in the reservoir chamber. The fluid drive acts on the fluid in contact therewith to force fluid in the reservoir chamber into the working chamber through the inflow orifice as the housing rotates relative to the driven shaft while the valve lever is open.

18 Claims, 3 Drawing Sheets

FLUID CLUTCH

BACKGROUND OF THE INVENTION

A fluid clutch having a drive disk fixedly attached to a driven shaft and rotatable in a working chamber formed in a housing, which is rotatably mounted on the driven shaft and has a dividing wall forming the working chamber and a reservoir chamber, has been contemplated by the present inventor, as described in DE 43 44 085 A1. Here, a flow connection to the working chamber is provided via at least one inflow orifice, which is controlled by a valve lever, and one return flow passage. In this clutch, the valve lever is controlled by a fixedly held electromagnet positioned in the reservoir chamber.

In this type of clutch, as in all conventional fluid clutches, the return flow of the working fluid (typically silicone fluid) from the reservoir chamber into the working chamber is brought out exclusively by inertial forces. Consequently, the housing needs to rotate at a specific rotational speed to generate sufficient return flow forces. In a known design of a fluid clutch, the so-called idling speed is about 700 revolutions per minute (RPM) because only above such a high rotational speed is it actually possible to ensure that the working fluid is forced into the working chamber sufficiently quickly after the valve lever has opened. This relatively high idling speed is undesirable in that it unnecessarily consumes energy, but has been unavoidable. For example, in the case of conventional fan clutches for utility vehicles, in the order of 1 to 3 kilowatts are consumed needlessly.

Accordingly, there is a need for a fluid clutch that is fully operational at lower idle speeds to reduce fuel consumption. The present invention fulfills this need.

SUMMARY OF THE INVENTION

According to the present invention, a fluid clutch includes a fluid drive that can force fluid into the working chamber even at low speeds, which can be in the range of 150 to 700 RPM. Specifically, the fluid clutch comprises a driven shaft, a drive disk attached to the driven shaft, and a housing rotatably mounted on the driven shaft. The housing has a dividing wall forming a working chamber and a reservoir chamber. The drive disk is rotatable in the working chamber. The housing has at least one inflow orifice, preferably in the dividing wall, to communicate fluid in the reservoir chamber to the working chamber and a return flow passage to communicate fluid in the working chamber to the reservoir chamber. The inflow orifice is controlled by opening and closing a valve lever. In this respect, an electromagnet can be stationarily positioned in the reservoir chamber to control the valve lever.

A fluid drive is positioned in the reservoir chamber and adapted to force fluid in the reservoir chamber into the working chamber through the inflow orifice as the housing rotates relative to the driven shaft while the valve lever is open. Preferably, the fluid drive is attached to the electromagnet. The fluid drive preferably is positioned adjacent the inflow orifice so that the inflow orifice rotates past the fluid drive as the housing rotates relative to the driven shaft.

An embodiment of the present invention can include a second or inner inflow orifice also formed in the dividing wall. The second inflow orifice is positioned radially closer to an axis of rotation of the driven shaft than the first or outer inflow orifice. The fluid drive protrudes in a radial direction with respect to the axis as far as the second inflow orifice.

The fluid drive is adapted to move fluid. In this regard, the fluid drive can comprise a plurality of impeller vanes, which preferably form a blade ring.

BRIEF DESCRIPTION OF THE DRAWINGS

These and other features, aspects, and advantages of the present invention will become much more apparent from the following description, appended claims, and accompanying two exemplary embodiments.

DETAILED DESCRIPTION OF THE PREFERRED EMBODIMENTS

Figure 1:
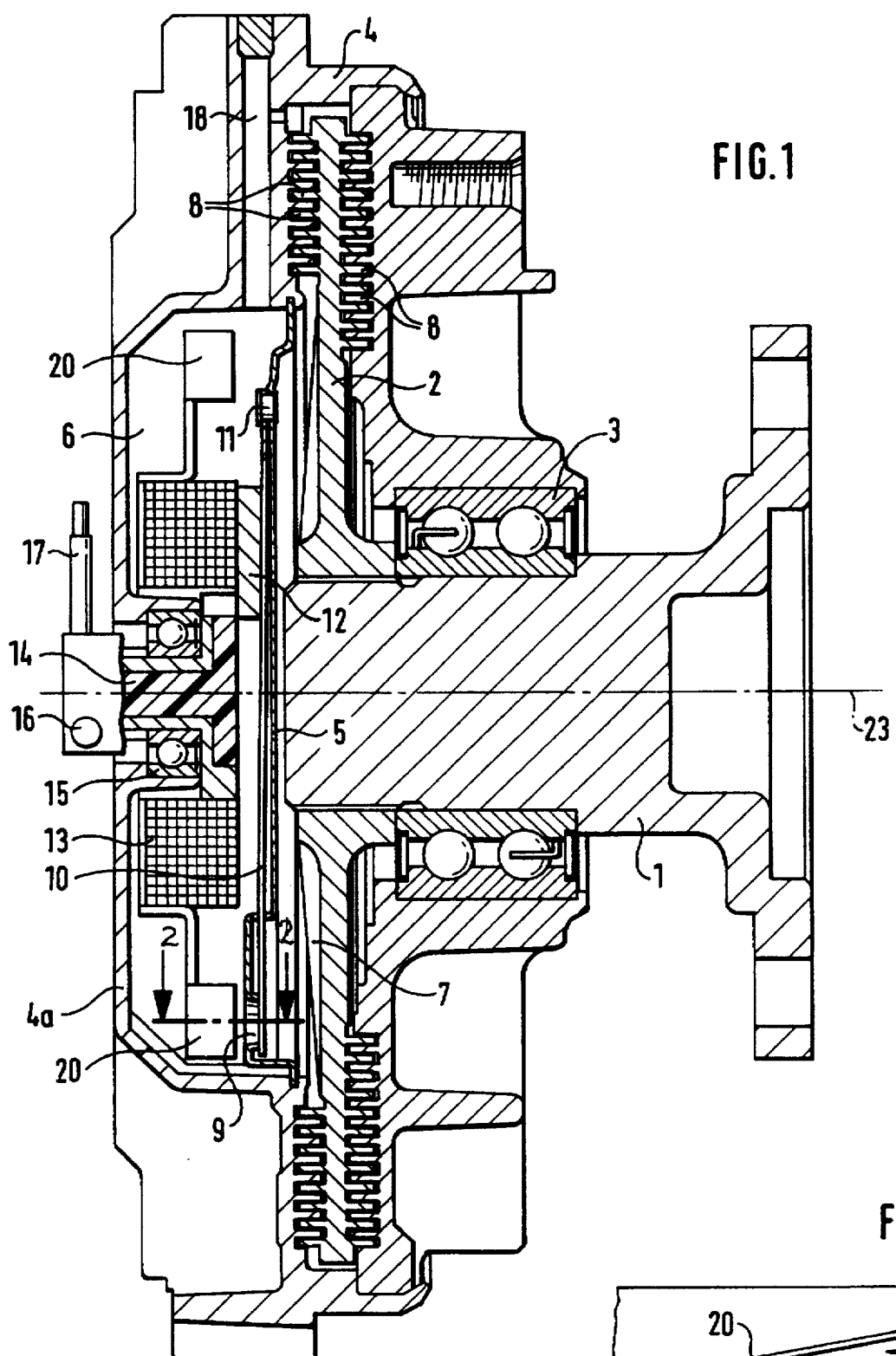
FIG. 1 shows a cross-section of a first embodiment of a fluid clutch according to the present invention.
Figure 2:
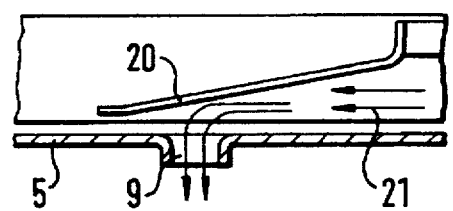
FIG. 2 shows the schematic representation of a section through the fluid clutch in FIG. 1 taken along the sectional line 2—2.

FIGS. 1 and 2 show a fluid clutch comprising a driven shaft (1), a drive disk (2) fixedly connected to the shaft (1), and a housing (4) rotatably mounted on the shaft (1) by means of a ball bearing (3). The housing (4), which forms the output part of the clutch, is divided by a dividing wall (5) into a reservoir space (6) and a working space (7). The drive disk (2) rotates in the working space (7) and is provided with circumferential ribs (8) in the outer region to increase the shearing surfaces for the working fluid. An inlet or inflow orifice (9) leads from the reservoir space (6) into the working space (7). In the representation according to FIG. 1, the inflow orifice (9) is closed off by a spring valve lever (10), which at the point (11) is attached to the dividing wall (5) in a spring-lever like fashion. The valve lever (10) is provided with an armature (12) opposite the electromagnet coil former (13), which is fixedly and stationarily held inside the reservoir chamber (6), similar to the one shown in aforementioned DE 43 44 085 A1. The securing means (14) for the electromagnet (13) is mounted with respect to the housing lid (4a) by means of a ball bearing (15) and is held permanently by means of a fixedly attached rod (16). Thus, the power supply (17) to the electromagnet (13) can be effected via the securing means (14). Referring to FIG. 1, when the electromagnet (13) is supplied with power, the valve lever (10) is attracted to the armature (12), causing the valve lever (10) to close the inflow orifice (9) to the working space (7). In a known manner, a return flow passage (18) leads back into the reservoir chamber (6) from the working space (7) so that a circulation of the clutch fluid, preferably silicone fluid, is brought about within the fluid clutch as soon as the inflow orifice (9) is opened. If the electromagnet (13) is not supplied with power, the valve lever (10) releases the inflow orifice (9) under spring pretension.

In the illustrated fluid clutch according to the invention, a blade ring fixedly carrying a fluid driving means, such as impeller or pump vanes (20), within the reservoir chamber (6) is permanently connected to the electromagnet (13) via a securing means. The pump vanes here are arranged obliquely, as also shown in FIG. 2, in such a way that as the housing (4) rotates the clutch, the blades (20) impacts against fluid in the direction of the arrows (21) and is forcibly directed to the region of the inflow orifice (9), which is located at the dividing wall (5) rotating along with the housing (4). The housing (4) and the fixed blades (20) thus form a pump device, with which it is possible, after the opening of the inflow orifice (9), to forcibly move the clutch fluid initially located in the reservoir space (6) into the working space (7), even if the relative speed between the blades (20) and the housing (4) is relatively low. Details of this are also given in the explanation of FIGS. 4 and 5.

Figure 3:
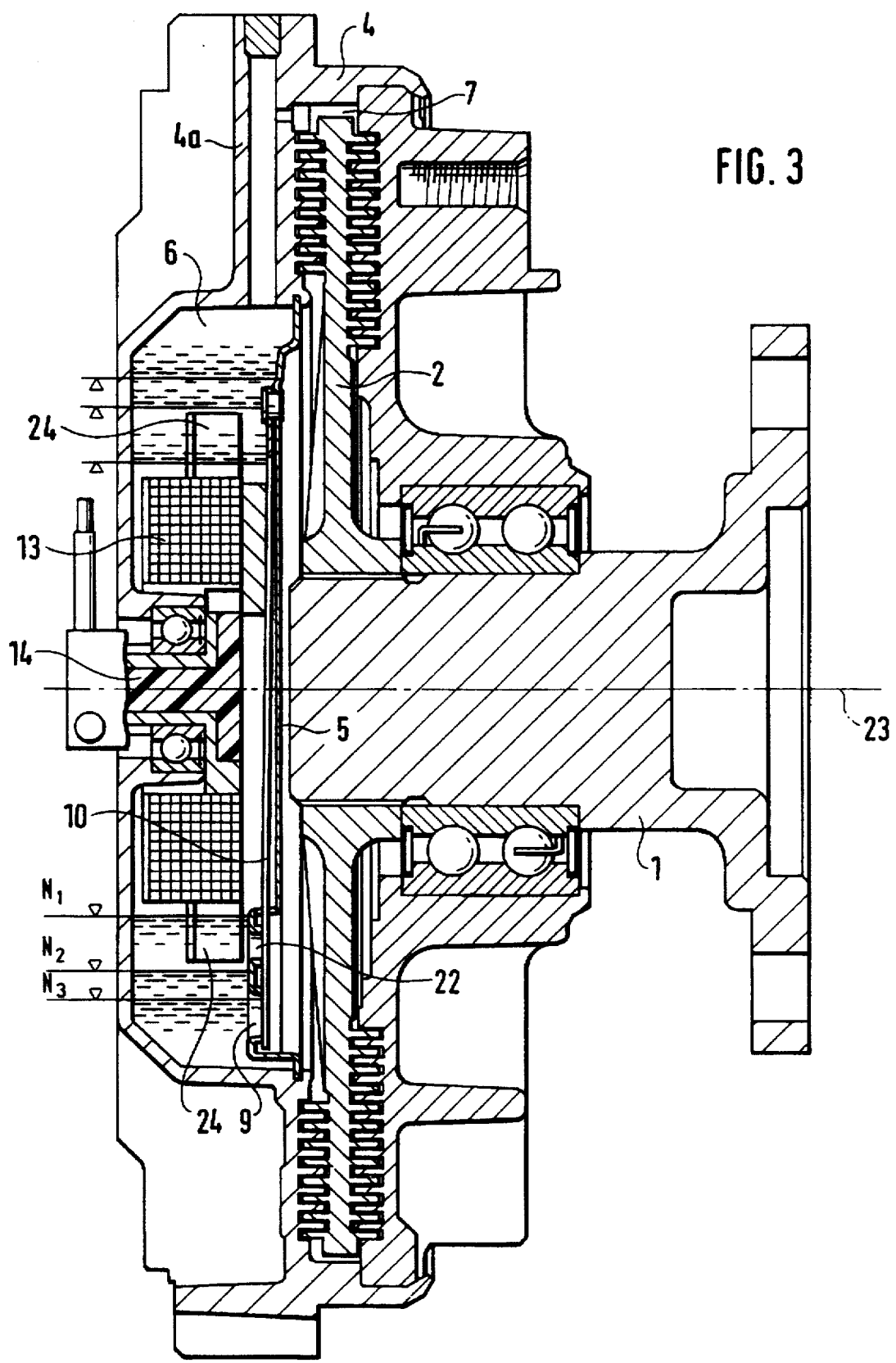
FIG. 3 shows a second embodiment of a fluid clutch according to the invention.

A second exemplary embodiment of a fluid clutch according to the invention is shown in FIG. 3. Here, identical parts to the embodiment in FIG. 1 are also designated by identical references. The difference here from the embodiment in FIG. 1 is that, in addition to the inflow orifice (9), a second or inner inflow orifice (22) is also formed in the dividing wall (5). The second inflow orifice (22) is located radially closer to the axis (23) of rotation of the clutch than the inflow orifice (9). This second inflow orifice (22) is likewise closed off by or opened by the valve lever (10) as a function of the excitation of the electromagnet (13). In the embodiment in FIG. 3, the fluid drive means, which comprises a ring of pump vanes or blade ring (24) carrying impeller or pump blades or vanes, whose radially outermost extent ends at a diameter region directly outside the inner inflow orifice (22), is positioned opposite the inner inflow orifice (22).

In order to clarify the effect of this measure, the level of the clutch fluid within the reservoir chamber (6) is respectively illustrated in various clutch states.

When the working space (7) is completely emptied and the entire quantity of clutch fluid is therefore located in the reservoir space (6), a ring of fluid will form within the reservoir chamber (6), provided that the housing (4) is rotating. The ring level ($N_1$) represents fluid at the smallest radius, running slightly outside the electromagnet (13), with respect to the axis (23) of rotation. If the electromagnet (13) is switched off in this state to switch on the clutch, the clutch fluid will enter through the inner inflow orifice (22) as a result of the pumping effect provided by the fixed pump vanes and the fluid moving relative thereto. If the rotational speed is sufficiently high to cause fluid to be conveyed by centrifugal force, the clutch fluid will also enter the working chamber (7) through the inflow opening (9).

Figure 4:
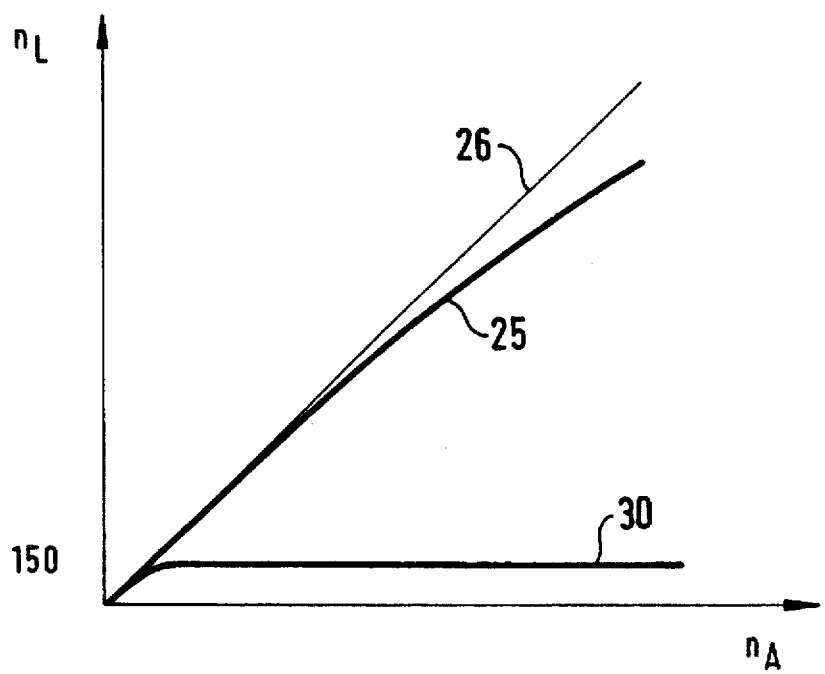
FIG. 4 shows a diagram with the representation of the rotational speed of a fan provided with a clutch according to the invention for the radiator of a motor vehicle.

In this context, FIG. 4 shows the relationship between the drive rotational speed ($n_A$) at which the driven shaft (1) rotates and the output rotational speed ($n_L$) of the housing (4), which, if the clutch is used for a vehicle fan, is usually provided with the fan vanes on the external circumference. Therefore, as the drive rotational speed increases, the rotational speed of the housing (4) also rises in accordance with the line (25), which deviates somewhat from the theoretical line (26) owing to friction losses. The idling speed is indicated by the curve (30).

Figure 5:
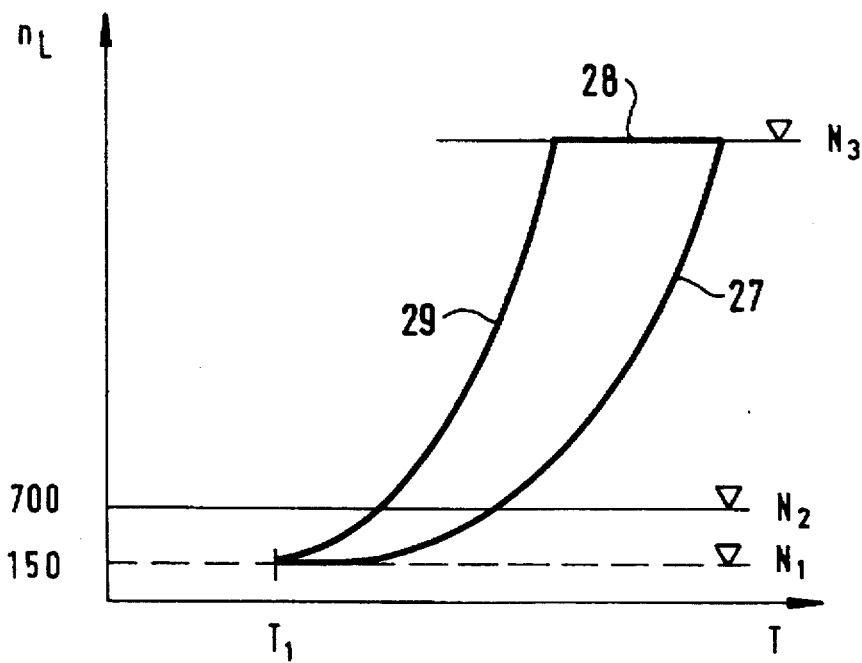
FIG. 5 shows a diagram in which the control range of a clutch according to the invention is shown schematically in a representation of the rotational speed against the temperature.

On the other hand, FIG. 5 shows the relationship of the rotational speeds ($n_L$) of the housing to the temperature (T) triggering the clutch control. It is clear that, as from a specific temperature ($T_1$), the clutch increases the rotational speed of the housing (4) along the line (27) up to a maximum achievable rotational speed, which takes place as a result of the working chamber (7) being filled. If the working chamber (7) is discharged again, the rotational speed of the housing (4) moves back along the curve branches (28, 29) owing to the hysteresis.

FIG. 5 shows the corresponding level of the clutch fluid in the reservoir chamber (6) shown in FIG. 3. It is clear that the maximum level $N_1$ within the reservoir chamber (when the fluid forms a rotating ring) corresponds to the state in which the working space is empty and the housing (4) therefore rotates with a minimum rotational speed, which is assumed in FIG. 5 as, for example, 150 RPM. As explained before, such a low rotational speed would not generate sufficient centrifugal force to permit the clutch fluid to enter the working space (7) quickly through the inflow orifice (9). It has been found, however, that even at such low housing RPM speeds, the pump device provided in accordance with FIGS. 1 and 3 is sufficient to force the clutch fluid into the working space (7).

When this takes place, after a specific time in which more and more fluid enters the working space, reducing the clutch fluid in the reservoir space (6), a higher rotational speed will be reached (for example, 700 RPM). The clutch fluid will be then at the level $N_2$, which corresponds to $N_2$ shown in FIG. 5 (rotational speed indicated, for example, at 700 RPM). Between the rotational speed of approximately 700 RPM and the maximum rotational speed, which may vary depending on the design, the control process of the clutch takes place along the line (27). The level $N_3$, which corresponds in FIG. 3 to the thinnest ring of fluid in the reservoir chamber (6), is reached when the working space is completely filled. Experience shows that starting from a rotational speed of, for example, 700 RPM, it is possible to control the fluid clutch even without the measures according to the invention.

FIGS. 3 and 5 indicate that it is possible with the invention to slow down the clutch below the range of, for example, 700 RPM without having to fear that the clutch will no longer be able to start up correctly. The range between the rotational speed examples of 150 and 700 RPM given in FIG. 5, which range corresponds to the level of the clutch fluid in the reservoir chamber (6) between $N_1$ and $N_2$, is covered by the inventive measure according to FIG. 3 by virtue of the blade ring (24) forcibly moving the fluid from the level $N_1$ to approximately the level $N_2$ through the inner inflow orifice (22) even if the rotational speed of the housing (4) is relatively low, between 150 and 700 RPM. If the housing (4) has reached the rotational speed of, for example, 700 RPM (FIG. 5), and the level of the ring of fluid in the reservoir chamber (6) has therefore dropped to the level $N_2$, the pump vanes of the blade ring (24) no longer dip into the fluid and, like previously known clutches, the fluid clutch operates only with the free cross-section of the inflow orifice (9), which is determined by the position of the valve lever (10). As a result of the additional arrangement of the pump vanes (24) the clutch according to the present invention can also be slowed down into an operational speed range that was not previously possible. The fluid clutch according to the present invention can therefore rotate at idling speeds that are many times lower than idling speeds possible with known fluid clutches without adversely affecting the operational capability. This in turn leads to a substantially lower consumption of energy during idling.

According to the present invention, low idling speeds are possible without the risk of adversely affecting the operation of the clutch. The present invention achieves this by providing at least one fixedly held fluid moving or pumping device projecting into the reservoir chamber. According to the invention, even at low rotational speeds of the housing, the pumping device forces the clutch fluid through the inflow orifice into the working chamber when the valve lever is open. The present invention is based on utilizing the idling speed of the clutch housing using a pumping effect, provided by a stationary pump impeller or pump blades in the reservoir chamber. It has been found that with this measure, the idling speeds can be significantly reduced and limited for example to 150 RPM or even less. Thus, unnecessary energy consumption can be avoided when the clutch is used as a fan clutch. Rapid engagement of the clutch is also possible even at a low fan speed.

According to the invention, the pump device may be arranged in the region of a diameter on which the inflow orifice is located. The pumping effect is thus exerted in the region in which the desired return flow into the working chamber also takes place.

According to the invention, the fluid clutch has an electromagnet fixedly or stationarily positioned in the reservoir chamber to control the valve lever. The pump device is preferably attached to the electromagnet so that a separate securing means for a blade ring, for example, can be dispensed with.

Further, according to the invention, a second or inner inflow orifice may be arranged in the dividing wall on a smaller diameter than a first or outer inflow orifice. Further, the pump vane or vanes can protrude in a radial direction from the axis of the clutch only as far as the smaller diameter where the inner inflow orifice is located. This measure provides a great advantage in that the pump blades only dip into the working fluid and force it back through the inner inflow orifice until a housing rotational speed reaches a conventional idling speed, for example, 700 RPM, to maintain the operation of the clutch. At this time, the ring of fluid formed in the housing is at a diameter greater than the diameter where the inner orifice is located, and therefore also at a diameter greater than the pump vane or vanes. Therefore, in this embodiment, when the rotational speed of the housing reaches the speed at which satisfactory control was previously possible, the pump vanes no longer dip into the ring of fluid. In this way, the pump vanes are prevented from stirring up the fluid, and for example forming an emulsion of air and fluid during the operation of the clutch. The two-stage action of the fluid return into the working chamber is therefore particularly advantageous.

Finally, according to the invention, a plurality of pump vanes may also form one blade ring with which the respectively desired pumping back effect can be achieved particularly advantageously.

Given the disclosure of the present invention, one versed in the art would readily appreciate that there may be other embodiments and modifications within the scope and spirit of the present invention. Accordingly, various modifications attainable by one versed in the art from the present disclosure within the scope and spirit of the present invention are to be included as further embodiments of the present invention. The scope of the present invention accordingly is to be defined as set forth in the appended claims.

I claim:

1. A fluid clutch comprising:
   a driven shaft;
   a drive disk attached to the driven shaft;
   a housing rotatably mounted on the driven shaft, the housing having a dividing wall forming a working chamber and a reservoir chamber, the drive disk being rotatable in the working chamber, the housing having an inflow orifice for communicating fluid in the reservoir chamber to the working chamber and a return flow passage for communicating fluid in the working chamber to the reservoir chamber, wherein the inflow orifice is controlled by opening and closing a valve lever; and
   a fluid drive stationarily positioned in the reservoir chamber and adapted to force fluid in the reservoir chamber into the working chamber through the inflow orifice as the housing rotates relative to the driven shaft while the valve lever is open.

2. A fluid clutch according to claim 1, wherein the fluid drive is positioned adjacent the inflow orifice so that the inflow orifice rotates past the fluid drive as the housing rotates relative to the driven shaft.

3. A fluid clutch according to claim 1, wherein the fluid drive comprises a plurality of impeller vanes.

4. A fluid clutch according to claim 3, wherein the impeller vanes form a blade ring.

5. A fluid clutch according to claim 1, wherein the fluid drive is adapted to force fluid through the inflow orifice at low speeds.

6. A fluid clutch according to claim 5, wherein the low speeds is in a range of 150 to 700 RPM.

7. A fluid clutch comprising:
   a driven shaft;
   a drive disk attached to the driven shaft;
   a housing rotatably mounted on the driven shaft, the housing having a dividing wall forming a working chamber and a reservoir chamber, the drive disk being rotatable in the working chamber, the housing having an inflow orifice for communicating fluid in the reservoir chamber to the working chamber and a return flow passage for communicating fluid in the working chamber to the reservoir chamber, wherein the inflow orifice is controlled by opening and closing a valve lever;
   an electromagnet stationarily positioned in the reservoir chamber for controlling the opening and closing of the valve lever; and
   a fluid drive attached to the electromagnet and stationarily positioned in the reservoir chamber, the fluid drive being adapted to force fluid in the reservoir chamber into the working chamber through the inflow orifice as the housing rotates relative to the driven shaft while the valve lever is open.

8. A fluid clutch comprising:
   a driven shaft;
   a drive disk attached to the driven shaft;
   a housing rotatably mounted on the driven shaft, the housing having a dividing wall forming a working chamber and a reservoir chamber, the drive disk being rotatable in the working chamber, the housing having an outer inflow orifice and an inner inflow orifice both formed in the dividing wall for communicating fluid in the reservoir chamber to the working chamber, and a return flow passage for communicating fluid in the working chamber to the reservoir chamber, wherein at least the inner inflow orifice is controlled by opening and closing a valve lever; and
   a fluid drive positioned in the reservoir chamber and adapted to force fluid in the reservoir chamber into the working chamber through the outer inflow orifice as the housing rotates relative to the driven shaft while the valve lever is open,
   wherein the inner inflow orifice is positioned radially closer to an axis of rotation of the driven shaft than the outer inflow orifice, wherein the fluid drive protrudes in a radial direction with respect to the axis as far as the inner inflow orifice.

9. A fluid clutch according to claim 8, wherein the fluid drive is adapted to force fluid through the inner inflow orifice at low speeds.

10. A fluid clutch according to claim 9, wherein the low speeds is in a range of 150 to 700 RPM.

11. A fluid clutch comprising:
    a driven shaft;
    a drive disk attached to the driven shaft;
    a housing rotatably mounted on the driven shaft, the housing having a dividing wall forming a working chamber and a reservoir chamber, the drive disk being rotatable in the working chamber, the housing having first and second inflow orifices for communicating fluid in the reservoir chamber to the working chamber and a return flow passage for communicating fluid in the working chamber to the reservoir chamber, wherein the first and second inflow orifices are controlled by opening and closing a valve lever; and a fluid drive positioned in the reservoir chamber and adapted to force fluid in the reservoir chamber into the working chamber through one of the first and second inflow orifices as the housing rotates relative to the driven shaft while the valve lever is open.

12. A fluid clutch according to claim 11, wherein the first and second inflow orifices are formed in the dividing wall, the second inflow orifice being positioned radially closer to an axis of rotation of the driven shaft than the first inflow orifice, wherein the fluid drive protrudes in a radial direction with respect to the axis as far as the second inflow orifice.

13. A fluid clutch according to claim 12, wherein the fluid drive is positioned adjacent the second inflow orifice so that the second inflow orifice rotates past the fluid drive as the housing rotates relative to the driven shaft.

14. A fluid clutch according to claim 13, wherein the fluid drive is adapted to force fluid through the second inflow orifice at low speeds.

15. A fluid clutch according to claim 14, wherein the low speeds is in a range of 150 to 700 RPM.

16. A fluid clutch according to claim 12, further comprising an electromagnet stationarily positioned in the reservoir chamber for controlling the valve lever, wherein the fluid drive is attached to the electromagnet.

17. A fluid clutch according to claim 16, wherein the fluid drive comprises a plurality of impeller vanes.

18. A fluid clutch according to claim 17, wherein the impeller vanes form a blade ring.

* * * * *